United States Patent
Chen et al.

(10) Patent No.: US 11,453,269 B2
(45) Date of Patent: Sep. 27, 2022

(54) POWER MANAGING METHOD AND SYSTEM FOR TRANSPORTATION REFRIGERATION UNIT

(71) Applicant: Carrier Corporation, Palm Beach Gardens, FL (US)

(72) Inventors: Linhui Chen, Shanghai (CN); Cyril Menard, Hauville (FR); Kangshan Xie, Shanghai (CN); Li Zhang, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 337 days.

(21) Appl. No.: 16/500,961

(22) PCT Filed: Apr. 4, 2018

(86) PCT No.: PCT/US2018/025995
§ 371 (c)(1),
(2) Date: Oct. 4, 2019

(87) PCT Pub. No.: WO2018/187405
PCT Pub. Date: Oct. 11, 2018

(65) Prior Publication Data
US 2020/0031201 A1     Jan. 30, 2020

(30) Foreign Application Priority Data
Apr. 7, 2017 (CN) .......................... 201710224011.1

(51) Int. Cl.
*B60H 1/32* (2006.01)
*B60H 1/00* (2006.01)
(Continued)

(52) U.S. Cl.
CPC ....... *B60H 1/3208* (2013.01); *B60H 1/00428* (2013.01); *B60H 1/3216* (2013.01);
(Continued)

(58) Field of Classification Search
CPC .............. B60H 1/3208; B60H 1/00428; B60H 1/3216; B60H 1/3232; B60H 1/3238;
(Continued)

(56) References Cited

U.S. PATENT DOCUMENTS 6,487,869 B1   12/2002   Sulc et al.
6,622,505 B2   9/2003    Anderson et al.
(Continued)

FOREIGN PATENT DOCUMENTS

CN   108351140 A  *  7/2018   ........... B60H 1/3232
EP   2528759 B1      11/2014
(Continued)

OTHER PUBLICATIONS

International Search Report and Written Opinion for application PCT/US2018/025995, dated Jun. 26, 2018, 12 pages.

*Primary Examiner* — Nelson J Nieves
(74) *Attorney, Agent, or Firm* — Cantor Colburn LLP

(57) ABSTRACT

A power management method used for power distribution in a transportation refrigeration unit. The power management method includes calculating engine power according to engine operating parameters; calculating power generator real-time input power according to power generator excitation current; calculating available power based on the power generator real-time input power and the engine power; and managing power distributed to a compressor based on the available power. The present invention further relates to a power management system. The power management method and system have the advantages of simplicity, reliability, stable operation and the like, the power generator real-time input power can be calculated according to the power generator excitation current, thus more power can be provided to the compressor on the premise that the power supply to power generator loads is guaranteed, and the (Continued)

operating efficiency of the transportation refrigeration unit is improved.

6 Claims, 2 Drawing Sheets

(51) Int. Cl.
 *F25B 49/02*  (2006.01)
 *F25B 41/22*  (2021.01)
 *F02D 41/02*  (2006.01)

(52) U.S. Cl.
 CPC .......... *F02D 41/021* (2013.01); *F25B 49/025* (2013.01); *B60H 1/3232* (2013.01); *B60H 2001/3238* (2013.01); *B60H 2001/3266* (2013.01); *B60H 2001/3273* (2013.01); *F25B 41/22* (2021.01); *F25B 2327/001* (2013.01); *F25B 2600/2515* (2013.01)

(58) Field of Classification Search
 CPC .... B60H 2001/3266; B60H 2001/3273; F25B 49/025; F25B 2327/001; F25B 2600/2515
 See application file for complete search history.

(56) References Cited

U.S. PATENT DOCUMENTS

| | | |
|---|---|---|
| 7,486,053 B2 | 2/2009 | Qi et al. |
| 8,723,458 B1 | 5/2014 | Chambers |
| 9,085,218 B2 | 7/2015 | Awwad |
| 9,121,407 B2 | 9/2015 | Pham |
| 9,140,489 B2 | 9/2015 | Duraisamy et al. |
| 9,499,027 B2 | 11/2016 | Steele et al. |
| 9,714,037 B2 | 7/2017 | Deruyck et al. |
| 10,017,055 B2 * | 7/2018 | Jeong ...................... B60L 1/003 |
| 2006/0288714 A1 | 12/2006 | Joyner |
| 2009/0056354 A1 * | 3/2009 | Davis ................... B60H 1/3205 |
| | | 62/236 |
| 2010/0171364 A1 * | 7/2010 | Awwad ................ B60H 1/3226 |
| | | 307/9.1 |
| 2011/0247351 A1 * | 10/2011 | Alston .................... F25B 25/00 |
| | | 62/235.1 |
| 2015/0121923 A1 | 5/2015 | Rusignuolo et al. |
| 2015/0158369 A1 | 6/2015 | Greiner et al. |
| 2015/0184912 A1 | 7/2015 | Nelson et al. |
| 2015/0328953 A1 * | 11/2015 | Sulc ....................... F25B 49/022 |
| | | 62/115 |
| 2015/0330693 A1 | 11/2015 | Sykora et al. |
| 2017/0225540 A1 * | 8/2017 | Ito ............................ B60H 1/00 |
| 2017/0327121 A1 * | 11/2017 | Eisenhour ............. B60K 25/00 |
| 2018/0273018 A1 * | 9/2018 | Follen ....................... B60L 7/10 |
| 2018/0312037 A1 * | 11/2018 | Uesugi ................. B60H 1/3208 |
| 2019/0041111 A1 * | 2/2019 | Sun ......................... F25B 27/00 |
| 2020/0018532 A1 * | 1/2020 | Omori ................. B60H 1/3216 |

FOREIGN PATENT DOCUMENTS

| | | | | |
|---|---|---|---|---|
| EP | 3144607 A1 * | 3/2017 | ............. | F25B 27/00 |
| JP | 2008281289 A * | 11/2008 | ............. | F25B 27/00 |
| WO | 2008153518 A1 | 12/2008 | | |
| WO | WO-2009029205 A1 * | 3/2009 | .......... | B60H 1/3205 |
| WO | WO-2016013193 A1 * | 1/2016 | ................ | F25B 5/04 |

* cited by examiner

POWER MANAGING METHOD AND SYSTEM FOR TRANSPORTATION REFRIGERATION UNIT

TECHNICAL FIELD

The present invention relates to the field of refrigeration or cooling, in particular to a power management method for a transportation refrigeration unit and a power management system for a transportation refrigeration unit.

BACKGROUND ART

As known, a mobile refrigeration system is typically arranged on a vehicle, train or other vehicles, so as to provide refrigeration for a partial area in the vehicle, e.g., provide refrigeration in a carriage or container. A mobile refrigeration system is usually used for providing refrigeration during transportation of some cargoes, e.g., providing a low-temperature environment during transportation of food which is easily corrupted or products which need to be preserved at low temperature. A transportation refrigeration unit is commonly arranged in a mobile refrigeration system to control environmental states such as temperature in the mobile refrigeration system. A transportation refrigeration unit typically comprises: an engine used for providing driving force or power; a power generator driven by the engine to supply power to power generator loads, which, for example, may be various fans, controllers, batteries and the like; and a refrigeration loop comprising a compressor providing refrigeration.

Since the output power of the engine is limited, power distribution needs to be performed between the engine and the compressor. The existing power management method usually causes power actually distributed to the power generator to be slightly larger, and consequently the power distributed to the compressor is reduced. Therefore, the compressor power determined according to a conventional power management method usually does not realize full utilization of the power of the engine, and the refrigeration efficiency of the refrigeration unit is reduced.

Therefore, there is a continuous demand for an improved power management method and system.

SUMMARY OF THE INVENTION

One purpose of the present invention is to provide a power management method, which can increase power distributed to a compressor and improve system efficiency on the premise that power demands of power generator loads are met. Another purpose of the present invention is to provide a power management system.

The purposes of the present invention are realized through the following technical solutions:

A power management method used for power distribution in a transportation refrigeration unit comprises the following steps:

calculating engine power according to engine operating parameters;

calculating power generator real-time input power according to power generator excitation current;

calculating available power based on the power generator real-time input power and the engine power; and managing power distributed to a compressor based on the available power.

Alternatively, the step of calculating the engine power comprises:

acquiring engine revolution speed and temperature; and calculating the engine power according to the engine revolution speed and temperature.

Alternatively, the step of calculating the power generator real-time input power comprises:

acquiring power generator efficiency, power generator excitation current and power generator voltage;

acquiring a conversion relationship and substituting the power generator excitation current into the conversion relationship to obtain power generator real output current; and multiplying the power generator real output current by the power generator voltage and dividing by the power generator efficiency to calculate the power generator real-time input power.

Alternatively, the conversion relationship is generated according to the following method:

acquiring numerical values of power generator excitation current and power generator output current which correspond to each other;

establishing a conversion relationship between the power generator excitation current and the power generator output current; and storing the conversion relationship.

Alternatively, the conversion relationship is established by means of linear regression.

Alternatively, in a process of calculating the available power, the available power is calculated by subtracting the power generator real-time input power from the engine power.

Alternatively, in a process of managing the power distributed to the compressor, opening of a suction pressure regulating valve at an upstream of the compressor is adjusted to manage the power distributed to the compressor.

A power management system used for power distribution in a transportation refrigeration unit comprises:

an engine power calculation module used for calculating engine power according to engine operating parameters;

a power generator real-time input power calculation module used for calculating power generator real-time input power according to power generator excitation current;

an available power calculation module used for receiving the power generator real-time input power and the engine power and configured to calculate available power based on the power generator real-time input power and the engine power; and a control module used for receiving the available power and configured to manage power distributed to a compressor based on the available power.

Alternatively, the engine power calculation module comprises:

an engine information acquisition module configured to acquire engine revolution speed and temperature; and a first calculation submodule used for receiving engine revolution speed and temperature and configured to calculate the engine power according to the engine revolution speed and temperature.

Alternatively, the power generator real-time input power calculation module comprises:

a first information acquisition module configured to acquire power generator efficiency, power generator excitation current and power generator voltage;

a conversion module configured to receive a conversion relationship from a memory, receive the power generator excitation current from the first information acquisition module and convert the power generator excitation current according to the conversion relationship to obtain power generator real output current; and a second calculation submodule configured to receive the power generator real output current from the conversion module and receive the power generator efficiency and the power generator voltage from the first information acquisition module, and configured to multiply the power generator real output current by the power generator voltage and divide by the power generator efficiency to calculate the power generator real-time input power.

Alternatively, the power management system further comprises a conversion relationship generation module comprising:

a second information acquisition module configured to acquire numerical values of power generator excitation current and power generator output current which correspond to each other;

a conversion relationship establishment module configured to receive the numerical values of power generator excitation current and power generator output current which correspond to each other from the second information acquisition module, and establish a conversion relationship between the power generator excitation current and the power generator output current; and a memory configured to acquire the conversion relationship from the conversion relationship establishment module and store the conversion relationship.

Alternatively, the conversion relationship establishment module is configured to establish the conversion relationship by means of linear regression.

Alternatively, the available power calculation module is configured to: receive the engine power from the engine power calculation module, receive the power generator real-time input power from the power generator real-time input power calculation module, and calculate the available power by subtracting the power generator real-time input power from the engine power.

Alternatively, the control module is configured to: receive the available power from the available power calculation module and adjust opening of a suction pressure regulating valve at an upstream of the compressor according to the available power to control the power distributed to the compressor.

Alternatively, the first information acquisition module is coupled to a power generator LIN bus and the second information acquisition module is coupled to the power generator LIN bus and an output current sensor.

The power management method and system provided by the present invention have the advantages of simplicity, reliability, stable operation and the like, the power generator real-time input power can be calculated according to the power generator excitation current, thus more power can be provided to the compressor on the premise that the power supply to power generator loads is guaranteed, and the operating efficiency of the transportation refrigeration unit is improved. Besides, the power management method and system provided by the present invention can adaptively change under the situation that the power generator loads change, and thus the system compatibility is improved.

BRIEF DESCRIPTION OF THE DRAWINGS

The present invention will be further described below in detail with reference to the drawings in combination with the preferred embodiments. However, one skilled in the art shall understand that these drawings are drawn for the purpose of explaining the preferred embodiments and thus shall not be used as limitations to the scope of the present invention. Besides, unless otherwise pointed out, the drawings are just used for conceptually illustrating the components or structures of the described objects, possibly contain exaggerated illustration and are not certainly drawn according to scales.

DETAILED DESCRIPTION

Figure 1:
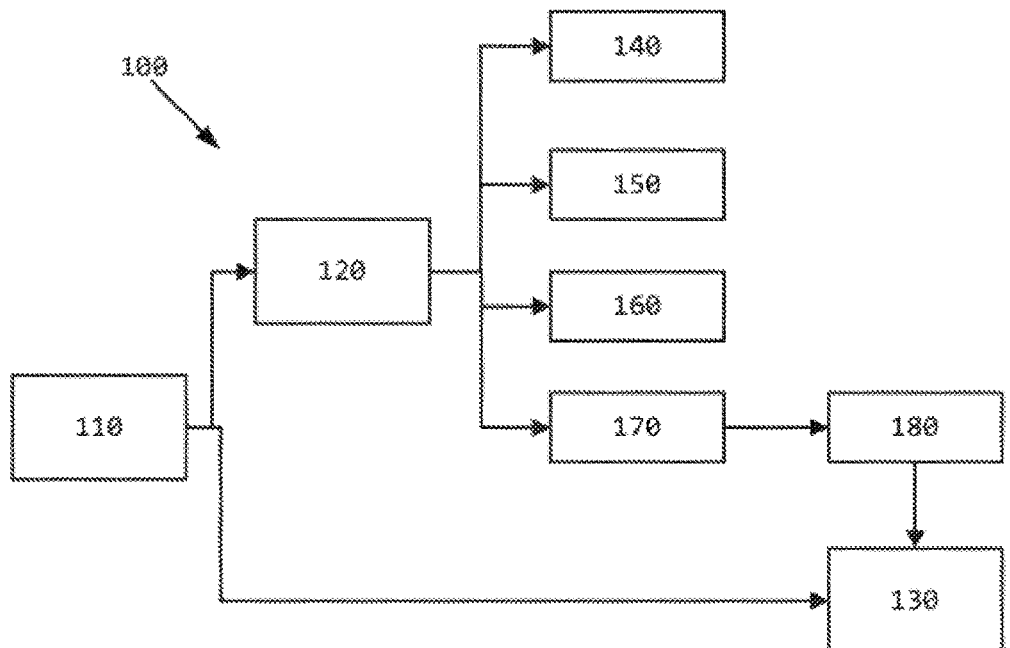
FIG. 1 illustrates a structural schematic diagram of a transportation refrigeration unit.

The preferred embodiments of the present invention will be described below in detail with reference to the drawings. One skilled in the art shall understand that these descriptions are just descriptive and exemplary and shall not be explained as limitations to the protective scope of the present invention.

Firstly, it needs to be stated that orientation words such as "top", "bottom", "upwards" and "downwards" mentioned herein are defined relative to directions in each drawing, are relatively concepts and can change according to different positions and different practical states. Therefore, these or other orientation words shall not be understood as restrictive words.

Besides, it also needs to be pointed out that any individual technical features described or implied in the embodiments herein or any individual technical features illustrated or implied in the drawings can still be continuously combined between these technical features (or equivalents thereof), so as to obtain other embodiments of the present invention directly mentioned herein.

It shall be noted that the same reference signs in different drawings represent the same or approximately same components.

FIG. 1 illustrates a structural schematic diagram of a transportation refrigeration unit. Herein, the transportation refrigeration unit 100 comprises: an engine 110; a power generator 120 and a compressor 130, wherein output power of the engine 110 is transmitted to the power generator 120 and the compressor 130 through a belt or a shaft; and a plurality of electric loads driven by the power generator 120.

Herein, the engine 110 is usually a diesel engine and has output power $P_e$.

The plurality of electric loads may comprise: a battery 140, a condenser fan 150, an evaporator fan 160, a controller 170, a suction pressure regulating valve 180 supplied with power and controlled by the controller 170, etc. The suction pressure regulating valve 180 is provided at an upstream of the compressor 130 and is used for controlling flow of refrigerant passing through the compressor 130. These electric loads are driven by the power generator 120. Herein, during operation, the condenser fan 150, the evaporator fan 160 and the controller 170 usually have a demand of relative stable power, while the battery 140 has a demand of variable voltage, because it possibly needs larger power when it needs to be charged and does not consume power when it does not need to be charged.

Since the output power $P_e$ of the engine 110 is usually limited and stable, power needs to be distributed between the power generator 120 and the compressor 130. In the existing power management method, power distributed to the compressor 130 is determined according to the following method:

(1) acquiring power demands of relatively stable parts of the plurality of electric loads, such as power demand $P_{cfm}$ of the condenser fan 150, power demand $P_{efm}$ of the evaporator fan 160 and power demand $P_c$ of the controller 170;

(2) acquiring a safety margin M according to parts having variable power demands in the plurality of electric loads;

(3) acquiring efficiency E of the power generator 120, which can be determined according to a known method in the art; and (4) acquiring available power $P_{ca}$ of the compressor 130 according to the following formula:

$$P_{ca}=P_e-(P_{cfm}+P_{efm}+Pc)*M/E,$$

where $P_e$ is total output of engine, $P_{cfm}$ is power of condenser fan; $P_{efm}$ is power of evaporator fan, $P_c$ is power of controller, M is safety margin determined in step (2) and E is engine efficiency determined in step (3).

After the available power $P_{ca}$ of the compressor 130 is determined, the controller 170 can correspondingly give out a control signal to the suction pressure regulating valve 180 to adjust the operating state of the compressor 130 to adapt to the available power $P_{ca}$.

However, the existing power management method has various defects. During operation, the calculated available power $P_{ca}$ usually is smaller than the power, which can be actually allocated to the compressor, in the output power of the engine. This is because that, in the existing power management method, in order to meet the demands of non-stable power electric loads such as the battery 140, a comparatively high value is adopted as M, resulting that the estimated values of the power needed by the electric loads of the power generator 120 are slightly large and consequently the estimated value of the power allocated to the compressor 130 is reduced. This causes that the compressor 130 does not operate in an optimum state, and the refrigeration capacity and refrigeration efficiency of the compressor are reduced.

Figure 2:
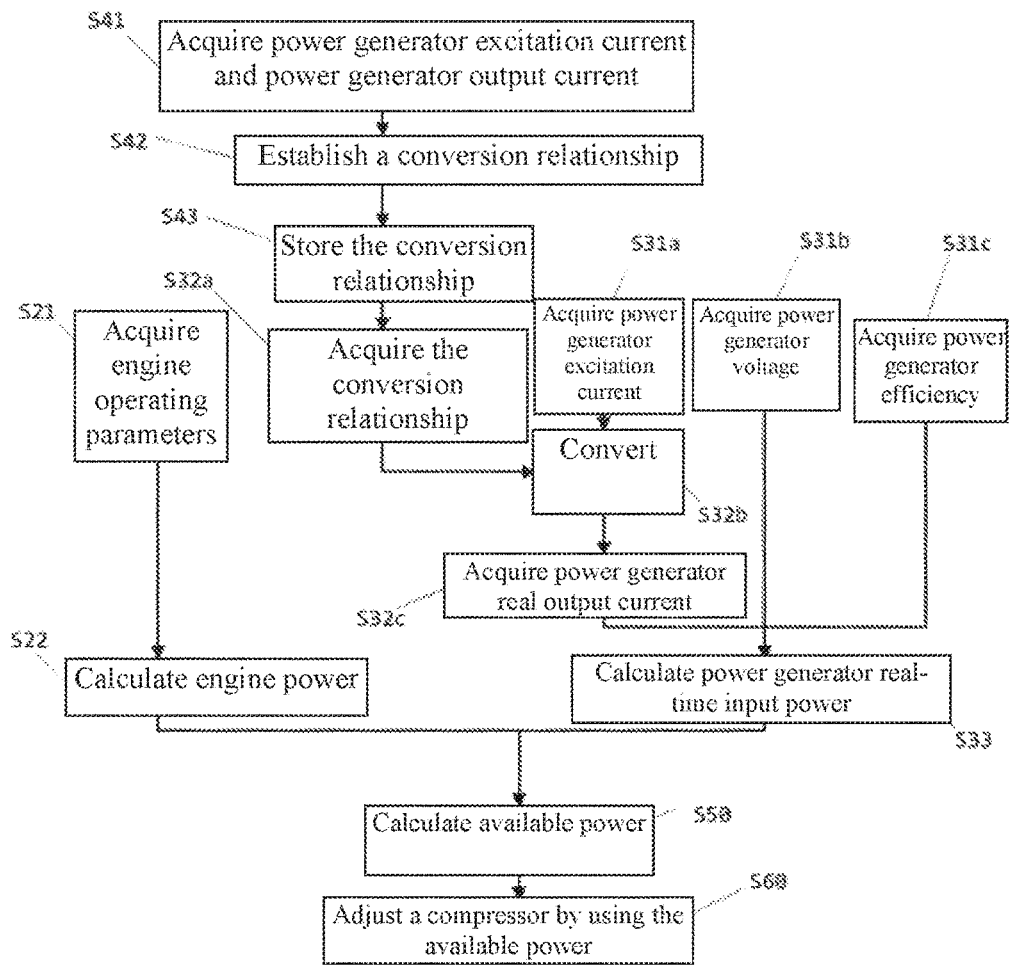
FIG. 2 illustrates a flowchart of a power management method provided by the present invention in one embodiment.

In order to solve the above-mentioned problem, the present invention provides a power management method for a transportation refrigeration unit. FIG. 2 illustrates a flowchart of a power management method provided by the present invention in one embodiment, wherein the power management method comprises the following steps:

calculating power generator real-time input power $P_a$ according to power generator excitation current $I_e$;

calculating engine power $P_e$ according to engine operating parameters;

calculating available power $P_1$ based on the power generator real-time input power $P_a$ and the engine power $P_e$; and managing power distributed to a compressor based on the available power $P_1$.

Further, the step of calculating the engine power $P_e$ comprises:

step S21: acquiring engine revolution speed and temperature, which can be completed by a sensor arranged on the engine or can be acquired according to LIN data output of the engine; and step S22: calculating the engine power $P_e$ according to the engine revolution speed and temperature. A specific method for calculating the engine power $P_e$ is known by one skilled in the art, and thus is not described in detail herein.

In step S22 of one embodiment of the present invention, firstly power at rated temperature can be obtained according to engine revolution speed through a revolution speed-power curve, and then the engine power $P_e$ is calculated according to the temperature of the engine and a temperature correction curve.

Further, the step of calculating the power generator real-time input power $P_a$ comprises:

step S31a: acquiring power generator efficiency E;

step S31b: acquiring power generator excitation current $I_e$;

step S31c: acquiring power generator voltage U;

step S32a: acquiring a conversion relationship f(x);

step S32b: substituting the power generator excitation current $I_e$ into the conversion relationship f(x) for conversion;

step S32c: obtaining power generator real output current $I_{ro}$; and step S33: multiplying the power generator real output current $I_{ro}$ by the power generator voltage U and dividing by the power generator efficiency E to calculate the power generator real-time input power $P_a$, i.e.:

$$P_a=I_{ro}*U/E,$$

Further, the conversion relationship f(x) is generated according to the following method:

step S41: acquiring numerical values of power generator excitation current $I_e$ and power generator output current $I_{ro}$ which correspond to each other;

step S42: establishing a conversion relationship f(x) between the power generator excitation current $I_e$ and the power generator output current $I_{ro}$; and step S43: storing the conversion relationship f(x).

In one embodiment of the present invention, in step S42, the conversion relationship f(x) is established by means of linear regression.

According to one example of data fitting of the present invention, the power generator real output current and the excitation current approximately have a linear relationship therebetween, and the relationship therebetween can be expressed by using a formula y=0.0272x+0.0089, and a certainty coefficient $R^2$ is 0.9959.

Further, in step S50, the available power $P_1$ is calculated by subtracting the power generator real-time input power $P_a$ from the engine power $P_e$, i.e.:

$$P_1=P_e-P_a.$$

Further, in step S60, opening of the suction pressure regulating valve 180 at an upstream of the compressor 130 is adjusted to manage the power distributed to the compressor 130.

Figure 3:
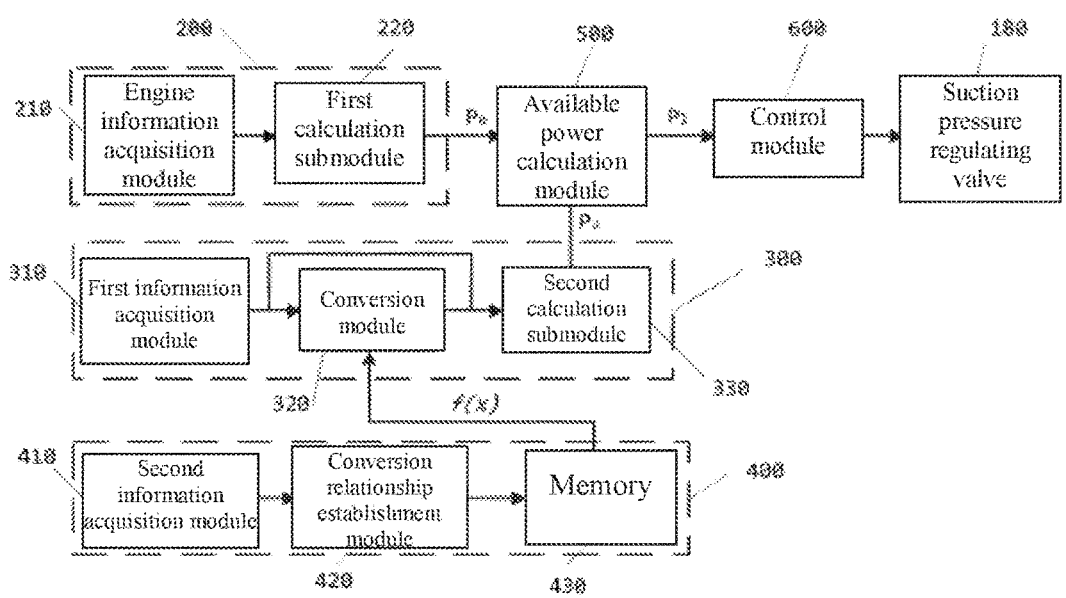
FIG. 3 illustrates a structural schematic diagram of a power management system provided by the present invention in one embodiment.

FIG. 3 illustrates a structural schematic diagram of a power management system provided by the present invention in one embodiment. The illustrated power management system is used for power distribution in a transportation refrigeration unit and comprises:

an engine power calculation module 200 used for calculating engine power $P_e$ according to engine operating parameters;

a power generator real-time input power calculation module 300 used for calculating power generator real-time input power $P_a$ according to power generator excitation current $I_e$;

an available power calculation module 500 used for receiving the power generator real-time input power $P_e$ and the engine power $P_a$ and configured to calculate available power $P_1$ based on the power generator real-time input power $P_e$ and the engine power $P_a$; and a control module 600 used for receiving the available power $P_1$ and configured to manage power distributed to a compressor 130 based on the available power $P_1$.

Further, the engine power calculation module 200 comprises:

an engine information acquisition module 210 configured to acquire engine revolution speed and temperature, wherein in one embodiment of the present invention, the engine information acquisition module 210 is a sensor arranged on the engine and/or an LIN data output of the engine; and a first calculation submodule 220 used for receiving engine revolution speed and temperature and configured to calculate the engine power according to the engine revolution speed and temperature. A specific method for calculating the engine power $P_e$ is known by one skilled in the art, and thus is not described in detail herein.

In one embodiment of the present invention, the first calculation submodule 220 may be configured to firstly obtain power at rated temperature according to engine revolution speed through a revolution speed-power curve, and then calculate the engine power $P_e$ according to the temperature of the engine and a temperature correction curve.

Further, the power generator real-time input power calculation module 300 comprises:

a first information acquisition module 310 configured to acquire power generator efficiency E, power generator excitation current $I_e$ and power generator voltage U;

a conversion module 320 configured to acquire the power generator excitation current $I_e$ from the first information acquisition module 310, acquire a conversion relationship f(x) from a memory 420, and convert the power generator excitation current $I_e$ according to the conversion relationship f(x) to obtain power generator real output current $I_{ro}$; and a second calculation submodule 330 configured to receive the power generator real output current $I_{ro}$ from the conversion module 320 and receive the power generator efficiency E and the power generator voltage U from the first information acquisition module, and configured to multiply the power generator real output current $I_{ro}$ by the power generator voltage U and divide by the power generator efficiency E to calculate the power generator real-time input power $P_a$, i.e.:

$$P_a = I_{ro} * U/E.$$

Further, the power management system further comprises a conversion relationship generation module comprising:

a second information acquisition module 410 configured to acquire numerical values of power generator excitation current $I_e$ and power generator output current $I_{ro}$ which correspond to each other;

a conversion relationship establishment module 420 configured to receive the numerical values of power generator excitation current $I_e$ and power generator output current $I_{ro}$ which correspond to each other from the second information acquisition module 410, and establish a conversion relationship f(x) between the power generator excitation current $I_e$ and the power generator output current $I_{ro}$; and a memory 430 configured to acquire the conversion relationship f(x) from the conversion relationship establishment module 420 and store the conversion relationship f(x).

Further, the conversion relationship establishment module 420 is configured to establish the conversion relationship f(x) by means of linear regression.

Further, the available power calculation module 500 is configured to: receive the engine power $P_e$ from the engine power calculation module 200, receive the power generator real-time input power $P_a$ from the power generator real-time input power calculation module 300, and calculate the available power $P_1$ by subtracting the power generator real-time input power $P_a$ from the engine power $P_e$, i.e.:

$$P_1 = P_e - P_a.$$

Further, the control module 600 is configured to: receive the available power $P_1$ from the available power calculation module 500 and adjust opening of a suction pressure regulating valve 180 at an upstream of the compressor 130 according to the available power $P_1$ to control the power distributed to the compressor 130.

Alternatively, the first information acquisition module 310 is coupled to a power generator LIN bus and the second information acquisition module 410 is coupled to the power generator LIN bus and an output current sensor.

Alternatively, the power generator excitation current $I_e$ is acquired from a power generator data output. The power generator data output comprises an LIN bus, a CAN bus, a wireless network, a cellular phone network, a bluetooth or the like.

Alternatively, after the conversion relationship f(x) is obtained, the conversion relationship f(x) can be stored in the controller.

The above-mentioned power management method and system can be typically used in the transportation refrigeration unit illustrated in FIG. 1. During operation, the power generator real output current $I_{ro}$ simultaneously reflects the power demands of all power generator loads, and can also reflect the power demand of the battery under the situation that the power demands of parts such as the fans and the controller are met.

The power management method provided by the present invention can more accurately identify real power consumed by the power generator loads in the transportation refrigeration unit, thus the value of power allocated to the power generator to be more accurate and the power is prevented from being wasted. Besides, the power management method provided by the present invention can allocate more power to the compressor in the transportation refrigeration unit, thus the refrigeration capacity is improved, which helps the product to get an environmental certification.

The description discloses the present invention with reference to the drawings and also enables one skilled in the art to be capable of implementing the present invention, including manufacturing and using any devices or systems, selecting suitable materials and using any combined methods. The scope of the present invention is defined by the technical solution requested to be protected, and contains other examples which can be conceived by one skilled in the art. As long as such other examples comprise structural components which are not different from the structural components described by the literal wording in the technical solution requested to be protected, or such other example contain equivalent structural components which are not substantively different from the structural components described by the literal wording in the technical solution requested to be protected, such other examples shall be considered as included in the protective scope determined by the technical solution requested to be protected by the present invention.

The invention claimed is:

1. A power management method used for power distribution in a transportation refrigeration unit, wherein the power management method comprises:

calculating engine power according to engine operating parameters;

calculating power generator real-time input power according to power generator excitation current;

calculating available power based on the power generator real-time input power and the engine power; and managing power distributed to a compressor based on the available power;

wherein the calculating the power generator real-time input power comprises:

acquiring power generator efficiency, power generator excitation current and power generator voltage;

acquiring a conversion relationship and substituting the power generator excitation current into the conversion relationship to obtain power generator real output current; and multiplying the power generator real output current by the power generator voltage and dividing by the power generator efficiency to calculate the power generator real-time input power.

2. The power management method according to claim 1 wherein the calculating the available power is determined by subtracting the power generator real-time input power from the engine power.

3. The power management method according to claim 2, wherein the calculating the engine power comprises:

acquiring engine revolution speed and temperature; and calculating the engine power according to the engine revolution speed and temperature.

4. The power management method according to claim 1, wherein the conversion relationship is generated according to the following method:

acquiring numerical values of power generator excitation current and power generator output current which correspond to each other;

establishing a conversion relationship between the power generator excitation current and the power generator output current; and storing the conversion relationship.

5. The power management method according to claim 4, wherein the conversion relationship is established by means of linear regression.

6. The power management method according to claim 1, wherein, in a process of managing the power distributed to the compressor, opening of a suction pressure regulating valve at an upstream of the compressor is adjusted to manage the power distributed to the compressor.

* * * * *